3,297,592
HIGH TEMPERATURE RESISTANT POLYMERIC CYCLODISILAZANES
Walter Fink, Zurich, Switzerland, assignor to Monsanto Company, St. Louis, Mo., a corporation of Delaware
No Drawing. Filed Oct. 14, 1964, Ser. No. 403,915
Claims priority, application Switzerland, Oct. 15, 1963, 12,731/63; Sept. 30, 1964, 12,735/64
11 Claims. (Cl. 260—2)

The present invention relates to a novel class of high temperature resistant polymeric cyclodisilazanes and a process for preparing same.

The novel polymers correspond to the formula (A) 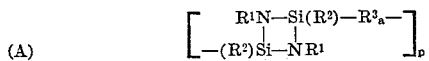

wherein $R^1$ is an alkyl, alkenyl, alkynyl, cycloalkyl, cycloalkenyl, aralkyl, aralkenyl, aralkynyl, alkaryl, alkenylaryl, alkynylaryl, aryl or heterocyclic radical having up to 24 carbon atoms and possibly being substituted; $R^2$ is defined as $R^1$, or is a group —$OR^4$ ($R^4$=alkyl, alkenyl, cycloalkyl, cycloalkenyl, alkaryl, alkenylaryl, aralkyl, aralkenyl or aryl, having 1 to 24 carbon atoms and possibly showing halogen, tertiary amino group, or further —$OR^4$ recurring up to 10 times), a group —$NR^5R^6$ (when taken singly $R^5$=$R^4$, or a hydrogen atom, and $R^6$=$R^5$, or alkali metal atom; when taken together form a cyclic structure), a group —$SiR^4_3$ ($R^4$ is defined as above), or a fluorine atom; $R^3$ is a possibly substituted alkylene, alkenylene, alkynylene, cycloalkylene, cycloalkenylene, aralkylene, aralkenylene, aralkynylene, alkarylene, alkenylarylene, alkynylarylene, biarylene, dialkylene ether, poly(alkylene ether), diarylene ether, alkylene-arylene ether, poly(arylene ether), or a corresponding ether group which contains —S—, —SO—, —$SO_2$—, —$NR^5$—, or —$Si(R^4)_2$— in the place of the oxygen ($R^4$ and $R^5$ are defined as above); $a$ is zero or 1, and $p$ represents the degree of polymerization. Especially desirable compositions are those in which each R group has not more than 8 carbon atoms.

The polymreic cyclodisilazanes of invention are obtained in principle by decomposition of certain silazanes which can generally be expressed by the formula (B) $R^1N$—$Si(R^2)$—$R^3_a$—$(R^2)Si$—$NR^1$
    |    |              |    |
    Y    Z              Z    Y The starting compounds (B) suitable for carrying out the invention contain an amine group Z cleavable in the reaction and which, together with a hydrogen atom Y, is released during the cyclization and polymerization process. $R^1$ to $R^3$ are defined as before. The preferred amine groups Z are derived from primary amines which are easily volatile at the reaction temperature. Examples are methylamine, ethylamine, n-propylamine, isopropylamine, n-butylamine, iso-butylamine, sec-butylamine, tert-butylamine, methoxymethylamine and methoxyethylamine. However the amine groups can also be derived from cycloaliphatic, araliphatic and aromatic amines, to the extent that these are volatile at the reaction temperature. The amine groups derived from secondary amines are less preferred. It has been found that the compounds having tertiary amino groups in most the cases yield only half the amount of the desired polymeric cyclodisilazanes, since a detrimental rearrangement occurs. Especially desirable silazanes are those in which each R group has not more than 8 carbon atoms.

Thus, the preferred starting compounds are more specifically represented by the formula general (C) 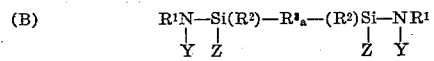

wherein $R^1$ to $R^4$ and $a$ are defined as above, $NHR^4$ identifies an amino group, preferably a secondary amino-group which is released in the reaction and $NHR^1$ identifies a secondary amino group which will become a constituent of the cyclodisilazane.

The formation of the polymeric cyclodisilazanes probably proceeds in all cases via an unstable, intermediate bis(silylimide) which quickly polymerizes with formation of very stable four-membered rings. This reaction can be schematized as follows:

$pR^1HN$—$Si(R^2)$—$R^3_a$—$(R)Si$—$NHR^1$ ⟶
      |                    |
     $NHR^4$              $NHR^4$ $[pR^1N$=$Si(R^2)$—$R^3_a$—$(R^2)Si$=$NR^1]$ ⟶

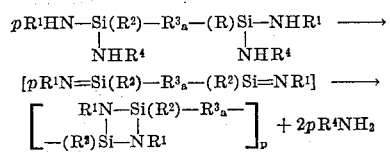 + $2pR^4NH_2$ wherein $R^1$ to $R^4$ and $a$ are defined as before.

From the equations above it is evident that the ring constituent $NR^1$ always is formed from a secondary amino group, while the amino group which is split off could also originate from a tertiary amino group.

The ease with which this reaction occurs depends on the amine group as well as on the organic groups on the silicon. The more volatile and/or basic the released amine is, and/or the more electron-furnishing the organic groups on the silicon are, the faster this reaction, as a rule, proceeds. For example, bis-[bis-(methylamino)-ethyl-silyl]-methane requires a lower reaction temperature than bis-[bis-(methylamino)-phenyl-silyl]-benzene and this latter a lower temperature than bis-[bis-(anilino)-phenyl-silyl]-benzene.

The starting compounds as generalized by the Formula B and more closely specified by the Formula C and which here further are denoted tetraaminodisilanes, have not been known up to now. The simplest representatives contain four identical amino groups. They can be obtained in a simple manner by reaction of a tetrahalodisilane, preferably a tetrachlorodisilane, with optional primary amine in the presence of an acid scavenger. This reaction has been reported for the preparation of diaminosilanes. In general, an excess of the amine to be reacted is employed:

$X_2Si(R^2)$—$R^3_a$—$(R^2)SiX_2$ + $8H_2NR^4$ ⟶

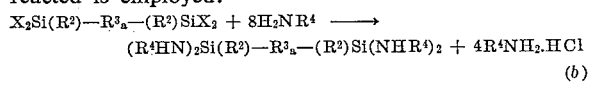      (b)

wherein $R^2$ to $R^4$ and $a$ are defined as before and X is a halogen atom, preferably a chlorine atom.

In the cases where all the amino groups are identical, the amine employed must be volatile at the reaction temperature, since two of the amino groups are split off in the reaction of invention. From Equation $a$ it is apparent that only two of the four amino groups present in the starting compound must be derived from a distillable or volatile amine. Therefore, polymeric cyclodisilazanes can be prepared which as a ring constituent have a group of a difficultly volatile or non-volatile amine. The tetraaminodisilanes which are unsymmetrical with respect to their amino groups and have simultaneously a group of an easily volatile amine, such as methylamine, ethylamine, n-propylamine, iso-propylamine, n-butylamine, iso-butylamine, sec-butylamine, tert-butylamine, methoxymethylamine and methoxyethylamine, etc. besides a rest of a difficultly volatile or non-volatile amine, such as aniline, naphthylamines, aminobiphenyls, aminodiphenylamines, aminostilbenes, aminoindoles, aminocarbazoles, aminodiphenylethers, aminodiphenylsulfides, etc. can be used for this purpose. These starting compounds containing two different amino groups attached to each silicon can be prepared either by a stepwise reaction of an organic tetrachlorodisilane with two different amines, or better by transamination of a symmetrical tetraaminodisilane. These reactions in principle are known and have been reported with the simple organic aminosilanes. Using the first method, a sterically hindered amine (e.g. tertiary butylamine, alpha-naphthylamine) or a weakly basic amine (e.g. aniline, aminoterphenyl, beta-naphthylamine) is conveniently reacted at the first step, in order to avoid the formation of tetrasubstituted symmetric products. Then, the easily volatile and, as a rule, strongly basic amine (e.g. methylamine, dimethylamine, ethylamine, diethylamine) which better can replace the remaining halogen atoms of the tetrahalodisilane, is introduced at the second step.

Using the second method for preparing unsymmetric tetraaminodisilanes, a symmetric tetraaminodisilane based on easily volatile amines is subjected to transamination with a difficultly volatile or non-volatile amine in a molar ratio of 1:2. In the transamination, well-known facts, such as the strength of the Si—N bond, which is affected by the substituents on the silicon and nitrogen, as has been mentioned before, as well as steric occurrences have to be respected.

The transamination proceeds according to the following equation:

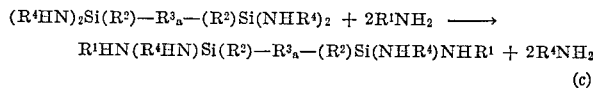

$$R^1HN(R^4HN)Si(R^2)-R^3{}_a-(R^2)Si(NHR^4)NHR^1 + 2R^4NH_2$$

(c)

wherein $R^1$ to $R^4$ and $a$ are defined as before.

The resulting compounds can be isolated. However, it is expedient to renounce the isolation and to carry out the subsequent pyrolytic decomposition into the polymeric cyclodisilazanes in the same batch.

The choice of amines suitable for the preparation of tetraaminodisilanes, and thus, also of polymeric cyclodisilazanes, is very great. Regarding the amine groups becoming a part of the four-membered ring, some examples of $R^1$ are: alkenyls, alkyls and alkynyls such as methyl, ethyl, vinyl, ethynyl, n-propyl, iso-propyl, allyl, propenyl, propargyl, propynyl, n-butyl, iso-butyl, sec-butyl, tert-butyl, methallyl, 1-butenyl, crotyl, butadienyl, 1-butynyl, 2-butynyl, 1-buten-2-ynyl and higher aliphatic groups having up to 24 carbon atoms such as undecenyl, dodecyl, myristyl, oleyl, tetracosyl; cycloalkyls and cycloalkenyls such as cyclopentyl, cyclopentenyl, cyclopentadienyl, cyclohexyl, cyclohexenyl, cyclohexadienyl and larger alicyclic groups having up to 12 carbon atoms such as cyclododecyl, cyclooctyl, cyclooctatrienyl, cyclododecatrienyl, bicyclohexyl; aralkyls, aralkenyls and aralkynyls such as benzyl, cuminyl, phenylethyl, styryl, phenylethynyl, phenylpropyl, 3-phenylallyl, 2-phenylallyl, cinnamyl, 1-phenylpropynyl, diphenylmethyl, triphenylmethyl, α-naphthylmethyl, β-naphthylmethyl, α-naphthylethyl, β-naphthylethyl, α-naphthylethenyl, β-naphthylethenyl, α-naphthylethynyl, β-naphthylethynyl; alkaryls, alkenylaryls and alkynylaryls such as tolyl, xylyl, mesityl, duryl, ethylphenyl, cumyl, methyl, vinylphenyl, ethynylphenyl, propargylphenyl, propynylphenyl, tert-butylphenyl, 1-vinylnaphthyl, 2-vinylnaphthyl, 1-ethynylnaphthyl, 2-ethynylnaphthyl; aryls such as phenyl, o-biphenylyl, m-biphenylyl, p-biphenylyl, p-terphenyl, m-terphenylyl, 1-naphthyl, 2-naphthyl, 2-anthryl, 9-anthryl, 1-phenanthryl, 2-phenanthryl, 3-phenanthryl, 4-phenanthryl, 9-phenanthryl; and heterocyclic groups such as pyrryl, furyl, benzofuryl, thienyl, pyrrolinyl, pyrazolyl, pyrazolinyl, imidazolyl, thiazolyl, oxazolyl, isooxazolyl, pyrazinyl, pyrimidyl, pyridazinyl, pyridyl, pyranyl, thiopyranyl, piperidyl, morpholinyl, thiazinyl, triazinyl, quinolyl, quinazolyl, quinoxalyl, indolyl, carbazolyl. If an —NH— group is present it is preferably substituted like in N-methylpyrryl, N-trimethylsilylimidazolyl, etc.

It has been found that the enumerated hydrocarbon groups as well as the heterocyclic groups can possess substituents and these substituents will not hinder the success of the reaction. Examples of possible substituents are Cl, Br, I, F, —$OR^6$, —$SR^6$, —$COR^4$, —$CSR^4$, $COOR^6$, —$OCOR^4$, —$CONR^5R^6$, —$N(R^6)COR^4$, —$N(R^6)COOR^4$, —$N(R^6)CONR^4R^5$, —$NR^5R^6$, —$N=NR^4$, $=NR^6$, —$N=CR^4R^5$, —CN, —$NO_2$, —$SOR^4$, —$SO_2R^4$, —$SO_2OR^6$, —$SO_2NR^5R^6$, —$N(R^6)SO_2R^4$, —$N(R^6)SO_3R^6$ and —$SiR^4{}_3$, wherein $R^4$ to $R^6$ are defined as before.

Some examples of substituted amines are: chloroanilines, bromoanilines, fluoranilines, aminodichloropyrimidines, amino-beta-chlorostyrenes, nitroanilines, beta-amino-beta-phenylnitroethane, aminoacetone, aminoacetylacetone, aminocyanoacetamid, aminoacetonitrile, aminoacetophenones, aminobenzophenones, aminobenzonitriles, aminocyanoiminazoles, anisidine, phenetidine, aminoveratroles, aminodiphenylsulfides, aminoazobenzenes, aminobenzoic acids, aminoacetic acid, aminoethanesulfonic acid, aminobenzene- sulfonic acids, amides and esters of carboxylic and sulfonic amino acids, allylamine, aminostyrene, beta-aminocrotononitrile etc.

Examples of $R^2$ which is attached to the silicon are such as enumerated for $R^1$. Moreover, $R^2$ can be a group —$OR^4$, wherein $R^4$ is defined as before. Some examples of hydrocarbyloxy substituents which can also be attached to $R^1$ instead of Si are methoxy, ethoxy, dimethylaminoethoxy, vinyloxy, n-propoxy, iso-propoxy, bis(trimethylsilyl)-amino-iso-propoxy, 1-propeneoxy, 2-propeneoxy, iso-propeneoxy, n-butoxy, iso-butoxy, sec-butoxy, tert-butoxy, crotoxy, n-amoxy, iso-amoxy, n-octanoxy, 10-undecyleneoxy, lauroxy, stearoxy, phenylmethoxy, styryloxy, phenylethynyloxy, 1-naphthoxy, 2-naphthoxy, m-diphenylaminophenoxy, asaryloxy, including the thio analogues having sulfur in the place of oxygen and showing the formula general —$SR^4$. Especially useful substituents possess several ether groupings branched or in sequence, such as methoxymethyleneoxy, methoxyethyleneoxy, ethoxyethyleneoxy, tert-butoxy-tert-butyleneoxy, veratroxy, anisoxy, phenetoxy, 3,4-dimethoxyphenenyloxy, 3-phenoxyphenyleneoxy, 3-phenoxy-4-methoxyphenenyloxy, 3,4 - diphenoxypheneyloxy, polymethyleneoxy of the formula general

wherein $R^7$ is an etherifying or esterifying terminal group as usual in polyoxymethylene compounds and $b$ is zero or an integer of 1 to 8, the parent substituents having ethylene or propylene in the place of methylene, poly-(alkylene ether) of the formula general

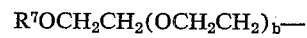

or $R^7OCH_2CH_2CH_2(OCH_2CH_2CH_2)_b$— wherein $R^7$ and $b$ are defined as above. Such substituents are obtained by action of ethylene oxide or propylene oxide on hydroxyalkylenes attached to silicon.

Moreover, $R^2$ can be a group —$NR^5R^6$, wherein $R^5$ and $R^6$ are defined as before. Some examples of amino substituents which can also be attached to $R^1$ instead of Si are methylamino, ethylamino, 2-chloroethylamino, n-propylamino, iso-propylamino, allylamino, n-butylamino, iso-butylamino, sec-butylamino, tert-butylamino, 4-trifluoro-n-butylamino, crotylamino, 3-butenylamino, propargylamino, 1-propynylamino, isoprenylamino, n-amylamino, iso-octylamino, n-dodecylamino, cyclohexylamino, cyclohexenylamino, cyclohexadienylamino, benzylamino, anilino, toluidino, p-phenylanilino, cumidino, anisidino, phenetidino, m-methoxyanilino, 2,3-dichloroanilino, pentafluoroanilino, p-anisylanilino, m-trifluoromethylanilino, N-diphenylbenzidino, biphenylylamino, 2-piperidylamino, 3-piperidylamino, 4-piperidylamino, acridinylamino, 2-furylamino, 3-furylamino, triazinylamino, 3-carbozolylamino, 1-carbazolylamino, the similarly disubstituted amino groups which can show identical or different hydrocarbyls or heterocyclic groups attached to the nitrogen; pyrrolino, pyrrolidino, pyrazolino, piperidino, morpholino, thiazino, N-trimethylsilylpiperazino, tetrahydroquinolino, decahydroquinolino. A transamination may occur in the reaction and cross-linking of the polymer will result. When such amino groups are attached to a group R¹, the transamination can be avoided by selecting a tertiary amino group.

A simple member of the great class of starting compounds conforms to the formula

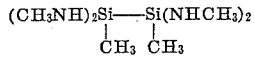

This compound can be prepared according to the Equations b and c using tetrachlorodimethyldisilane

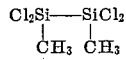

which is contained in the higher-boiling residues from the direct syntheses of methylchlorosilanes. Starting compounds having other organic substituents than methyl on the silicon can be obtained by reaction of hexachlorodisilanes with Grignard reagents in a molar ratio of 1:2 and subsequent exchange of the remaining chlorine atoms for amino groups. Other methods such as, for example, the coupling of $(R^4NH)_2Si(R^2)Cl$ or $$R^1NH(R^4NH)Si(R^2)Cl$$

by sodium can also be used.

A simple member of a further class of starting compounds conforms to the formula

The silicon atoms can be interrupted by other organic groups as formerly defined for R³. Examples are methylene, ethylene, phenylmethylene, diphenylmethylene, phenylene, durylene, biphenylylene, methylene ether, ethylene ether, dimethyleneoxymethylene, 1,2-dimethyleneoxyethylene, 1,4-dimethyleneoxyphenylene, 1,3-dimethyleneoxyphenylene. Especially valuable are the divalent groups derived from the following aromatic ethers: phenoxybenzene, $C_6H_5OC_6H_5$, toloxybenzene $$CH_3C_6H_4OC_6H_5$$

diphenylyloxybenzene $C_6H_5C_6H_4OC_6H_5$, beta - phenoxynaphthalin, alpha-phenoxynaphthalin $C_6H_5OC_{10}H_7$, toloxynaphthalin $CH_3C_6H_4OC_{10}H_7$, 1,4-diphenoxybenzene, 1,3-diphenoxybenzene, 1,2-diphenoxybenzene $$(C_6H_5O)_2C_6H_4$$

1,3,5-triphenoxybenzene, 1,2,3-triphenoxybenzene, 1,2,4-triphenoxybenzene $(C_6H_5O)_3C_6H_3$ etc., moreover poly (aryl ethers) $ArO(ArO)_cAr$, particularly poly(phenyl ethers) of the formula $C_6H_5O(C_6H_4O)_cC_6H_5$, wherein c is an integer of from 1 to 8. The monovalent groups derived from these aromatic ethers can also be attached to the silicon and/or nitrogen, i.e. represent a group R¹ and/or R². It may be pointed out that the aroxy groups may be in the ortho, meta or para position with respect to themselves as well as to the silicon or nitrogen atom of the cyclodisilazane.

The selection of the appropriate substituents which are preserved in the end products conforms with the desired properties, such as stability towards hydrolysis, oxidation and heat, thermoplasticity, curability, solubility, etc. of the polymers.

Whereas the transamination according to Equation c can be achieved at relatively low temperatures, the formation of the polymeric cyclodisilazanes needs higher temperatures. The convenient temperature may vary from case to case and conform with the boiling point of the components actually present. In the course of reaction the temperature may gradually be increased. The amine which is split off in the transamination and also in the final step, and which is generally low boiling, has to be removed from the reaction mixture for high yields of desired products, since it is supposed that the novel reaction is an equilibrium reaction. The removal of the amine may be accomplished in simple manner by continuous distillation (or sublimation in some instances), possibly under reduced pressure. Other known methods of elimination or inactivation of the released amine, of course, will not be excluded.

The starting compounds which contain an acid group are preferably brought to reaction in the form of their alkali salts.

The upper temperature limit of the reaction is defined by the decomposition point of the polymeric cyclodisilazanes to be prepared. This decomposition point in most of the cases is relatively very high. In general, in the range of from 350 to 500° C., a group R² (if any) is split off per each two silicon atoms with consequent cross-linking of the polymer. At still higher temperatures the group R¹ can also be split off, however the rate is slower. Further cross-linking ensues. It was found that the group R¹ is less easily released when containing negative substituents, especially fluorine.

The course of reaction can be followed up quantitatively by determination of the amine quantity which is evolved. The amine can be recovered and used again. In all cases investigated till now the conversion lies between about 90 and 100%. The degree of polymerization can be influenced by addition of chain-terminating agents, such as secondary amines, amines which cannot be removed, alcohols, phenols and silanols.

Thus, the novel polymeric cyclodisilazanes are obtained by a simple heating of the reactants at an elevated temperature until no more substantial quantity of the primary amine is released.

The polymers are liquid, waxy, glassy, glutinous, rubber-like or fiber-forming according to the organic group R¹, R² and R³. If they contain carboxylic, sulfo or other acid groups they can be soluble in water in the form of their alkali salts and become insoluble on acidfying. They can also be more or less cross-linked and insoluble in any usual organic solvent. They are resistant at temperatures up to 350 to 500° C. and more and can even be useful at temperatures up to 1000° C., where they lose a part of the organic constituents, but still remain an organic material.

Many of the polymers can be processed by the usual thermoplastic methods such as extrusion, injection molding, blown, calendered and extruded films and some other by conventional rubber molding techniques such as compression and transfer molding. The hard types of polymeric cyclodisilazanes are casting resins which are workable by using cutting machines, or the polymerization has to be carried out during the fabrication. The foamed polymers can be prepared in known manner by addition of blowing agents, like azo-bis-isobutyronitrile, dinitrosohexamethylene - tetraamine etc. The amine which is split off in the reaction can also act as a blowing agent. Especially suited are methylamine and ethylamine.

A further object of this invention is the use of the polymeric cyclodisilazanes in the preparation of coatings, films, impregnations etc. For this purpose the mixture of the starting reactant, i.e. the tetraaminodisilane may be applied to a substratum and subjected to such temperatures, as the formation of higher polymerized, possibly cross-linked synthetic composition coatings is achieved. Or the polymer may be applied in a solvent, such as hexane, benzene, tetrahydrofuran, acetone, ether, methanol, ethanol, etc. After evaporation of the solvent, the polymer possibly can be baked on their support, if the latter will resist to such an operation. The polymers are excellently suited for lacquers and impregnations of substrates such as paper, textiles, leather, plastics, wood, glass, metals, rubber, etc. The polymers can contain as additives other constituents such as powdered wood, asbesto, glass fibres, metal fibres, pigments, etc., thereby their mechanical properties will be modified.

EXAMPLE 1

Initial compound

104 G. 1,4-BIS(PHENYL-DICHLORO-SILYL)BENZENE (0.24 mol) in 200 ml. hexane are dripped into 100 g. ethylamine (2.2 mol) in 600 ml. hexane at 0° and subsequently boiled for 1¼ hours. 76.2 g. ethylamine hydrochloride are separated from which a conversion of 95% is calculated. The fractional distillation of the crude product yields 85.3 g. (78%)

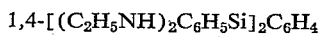

b.p. 206–8° C.; $n_{20}D$ 1.5619.

*Analysis.*—$C_{26}H_{38}N_4Si_2$—Calculated: Percent C, 67.47; H, 8.27; N, 12.11. Found: Percent C, 67.03; H, 8.36; N, 12.61.

*Mol. wt.*—Calculated, 462.8; found, 420.

FINAL PRODUCT 23.19 g. (0.05 mol) 1,4 - bis[bis - (ethylamino)-phenyslilyl]benzene, as obtained above, are heated in a flask to 297° C. The ethylamine splitting off is taken up in 1 nHCl and titrated. From this the conversion is calculated. The temperature is increased in the course of 11–12 hours to 322° C. Conversion 81.7%. The flask content has become solid, however can be re-melted at a somewhat higher temperature at which further condensation results.

A bright yellow resin is obtained that melts at about 350° C. It is insoluble in water and in the usual organic solvents. On still stronger heating it goes over into a cross-linked polymer with a splitting out of benzene.

EXAMPLE 2

A mixture of 23.15 g. (0.05 mol) 1,4-bis[bis-(ethylamino)-phenyl-silyl]benzene and 9.3 g. (0.1 mol) aniline are heated to 156° C. The ethylamine splitting out is taken up in 1 nHCl and and estimated by titration. The conversion is calculated from this. The temperature is increased to 510° C. in the course of 285 minutes. Conversion 96%. The flask content became solid at about 354° C. and from this temperature on benzene also is split off at the same time. The benzene splitting and cross-linking proceeds especially rapidly in the 550–600° C. range and then at 700° becomes insignificant.

A cross-linked polymer is obtained which does not melt up to about 1000° C. and is insoluble in water and all ordinary organic solvents. It is decomposed by hot concentrated $H_2SO_4$ and $HNO_3$.

What is claimed is:

1. A polymeric cyclodisilazane of the formula

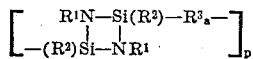

wherein $R_1$ and $R_2$ are hydrocarbyl groups having not more than 24 carbon atoms; $a$ is an integer from 0 to 1, and $p$ represents the degree of polymerization indicating that the structure within the brackets is repeated in the polymer chain a number of times.

2. A polymeric cyclodisilazane of claim 1 wherein $R^1$ and $R^2$ are hydrocarbyl having not more than 8 carbon atoms, $R^3$ is hydrocarbylene having not more than 8 carbon atoms, and $a$ is 1.

3. A process for preparing a polymeric cyclodisilazane of claim 1 comprising heating a compound of the formula

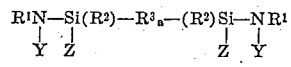

wherein $a$, $R^1$, $R^2$ and $R^3$ are as defined in claim 1, Y is the hydrogen atom, and Z is a secondary amino group which is derived from an easily volatile primary amine, at a sufficiently high temperature to cause the clevage of YZ by-product and less than the decomposition of the polymeric cyclodisilazane.

4. A process of claim 3 wherein a tetraaminodisilane of the formula

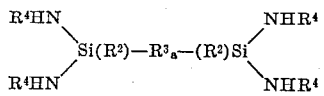

wherein $R^2$, $R^3$ and $a$ are defined as in claim 5, and the group $NHR_4$ is a secondary amino group derived from an easily volatile primary amine, and an amine of the formula $R^1NH_2$ wherein $R^1$ is defined as in claim 5, are heated in a molar ratio of about 1:2 at a temperature gradually increasing up to almost the decomposition temperature of the formed polymeric cyclodisilazane until no more substantial amount of primary amine $R^4NH_2$ is continuously removed from the reaction mixture.

5. A polymeric cyclodisilazane of the formula

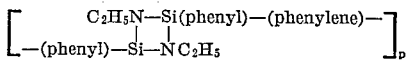

wherein $p$ represents the degree of polymerization.

6. A process for preparing a polymeric cyclodisilazane of claim 5 comprising heating 1,4-bis[bis-(ethylamino)-phenyl-silyl]benzene from about 290° C. to about 330° C. until no more substantial amount of ethylamine splits off.

7. A polymeric cyclodisilazane of the formula

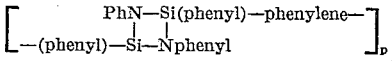

wherein $p$ represents the degree of polymerization.

8. A process for preparing a polymeric cyclodisilazane of claim 7 comprising heating 1,4-bis[bis-(ethylamino)-phenyl-silyl]benzene and anilne in a molar ratio of about 1:2 at a temperature from about 156° C. to about 350° C. until no more substantial amount of ethylamine splits off.

9. A silazane of the formula

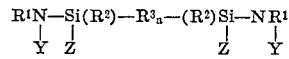

wherein $a$, $R^1$, $R^2$ and $R^3$ are defined as in claim 1, Y is the hydrogen atom, and Z is a secondary amino group which is derived from an easily volatile primary amine.

10. A silazane of claim 9 wherein $R^1$ and $R^2$ are hydrocarbyl having not more than 8 carbon atoms, $R^3$ is hydrocarbylene having not more than 8 carbon atoms, and $a$ is 1.

11. 1,4-bis[bis-(ethylamino)-phenyl-silyl]benzene.

References Cited by the Examiner

UNITED STATES PATENTS 3,140,288    7/1964    Peake _____ 260—448.2

DONALD E. CZAJA, *Primary Examiner.*

LEON J. BERCOVITZ, *Examiner.*

M. I. MARQUIS, *Assistant Examiner.*